C. N. BROCK.
Treating Bone Black.
No. { 1,675, 32,679. }
Patented July 2, 1861.
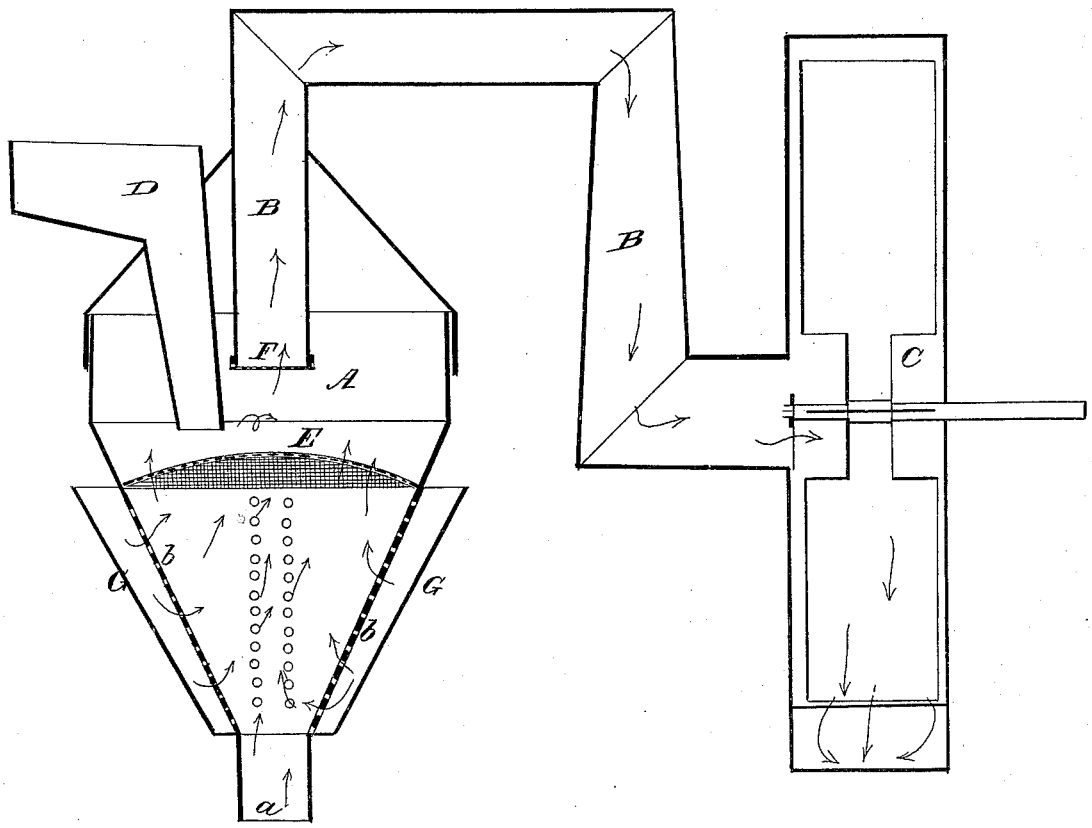
Witnesses.
J. W. Coomby.
R. S. Spencer
Inventor.
C. N. Brock
per Munn & Co.
Attorneys.

UNITED STATES PATENT OFFICE.

CHARLES N. BROCK, OF PHILADELPHIA, PENNSYLVANIA.

IMPROVEMENT IN APPARATUS FOR REVIVIFYING BONE-BLACK.

Specification forming part of Letters Patent No. 32,679, dated July 2, 1861.

*To all whom it may concern:*

Be it known that I, CHARLES N. BROCK, of the city of Philadelphia, in the county of Philadelphia and State of Pennsylvania, have invented a new and useful Improvement in the Process of Revivifying the Bone-Black Used in Sugar-Refining; and I do hereby declare that the following is a full, clear, and exact description of the same, reference being had to the accompanying drawing forming part of this specification, said drawing representing a central vertical section of an apparatus used in performing my invention.

The ordinary process of revivifying bone-black used in sugar refining consists in burning and washing. By burning, a large portion of the impurities are driven off in the form of gas, but a considerable quantity (lime, caramel, &c.) though separated, remains distributed in the state of fine dust over and among the grains of the black, and can be but very imperfectly extracted by washing. Washing has sometimes been performed before burning, but this fails to extract much of the impurity.

To enable others skilled in the art to use my invention, I will proceed to describe it with reference to the accompanying drawing.

A is an upright vessel or chamber, made of sheet-iron or other material, with its lower portion of the form of an inverted frustum of a cone, with a central opening, $a$, at its bottom for the entrance of an upward current of air and for the outlet of the bone-black.

B is a pipe connecting the upper part of the vessel A with a suitably-arranged exhausting-blower, C, and extending some distance downward into the said vessel.

D is a hopper entering the upper part of the vessel for the delivery thereinto of the bone-black, which it receives from the kiln.

E is a screen or perforated plate, fitted to the vessel A, below the mouth of the pipe B, and having openings large enough for the grains of bone-black to pass through.

F is a screen fitted to the mouth of the pipe B, and having its openings too small for the passage of the grains of bone-black. $b\ b$ are openings in the lower inverted conical portion of the vessel A, within the curb or casing G, and below the screen, said openings being too small for the passage of the grains of bone-black.

G G are shields to the said openings, closed at the bottom, but open at the top for the entrance of air.

The operation of the apparatus may be described as follows: The fan produces a strong upward current of air through the vessel A, the air entering by the openings $a$, while the dry burned bone-black delivered into the vessel by the hopper D falls through the said current. The impurities, by reason of their light dust-like character, are carried off through the blower, and the bone-black, in a pure state, falls through the opening $a$ into a suitable receptacle placed below. The opening $a$ may be furnished with a valve by which to close it while the vessel A is filling, the air in the meantime entering the chamber by the openings $b\ b$.

What I claim as my invention, and desire to secure by Letters Patent, is—

The combination of the perforated receiving-vessel A and diaphragm or screen E with the supply-pipe or vessel D, the air-pipe B, and fan C, substantially in the manner and for the purpose herein shown and described.

CHARLES N. BROCK.

Witnesses:
ROBERT HUTCHINSON,
WILLIAM SMITH.